Feb. 18, 1958     H. E. BALSIGER     2,823,963
ONE-PIECE RING BEARINGS

Filed Dec. 22, 1954     2 Sheets-Sheet 1

INVENTOR
HAROLD E. BALSIGER

BY *Mason, Porter, Diller & Stewart*

ATTORNEYS

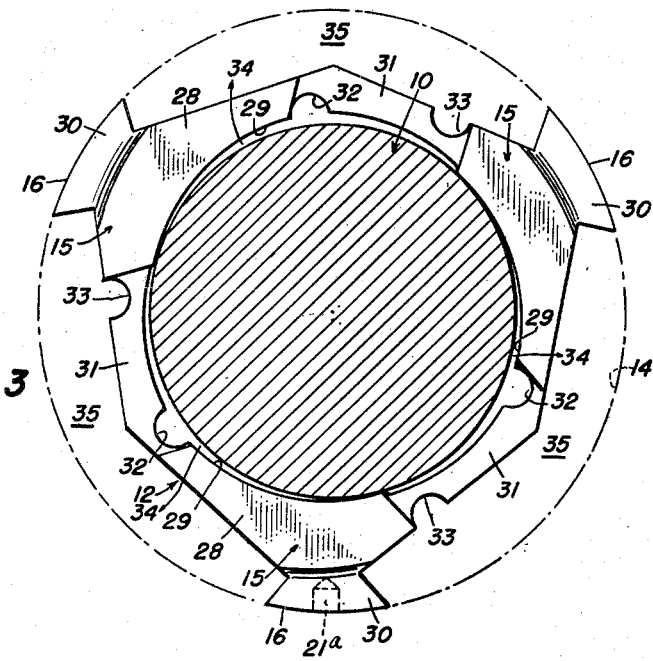
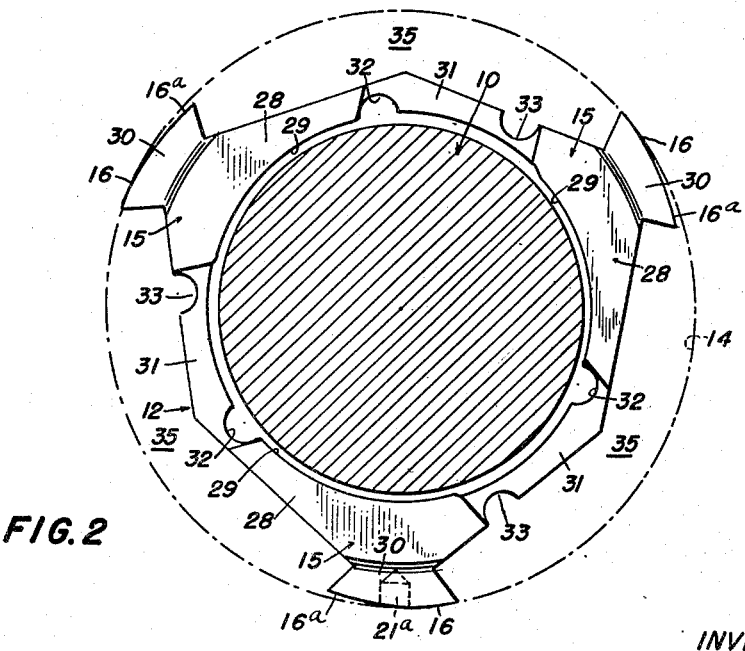

United States Patent Office 2,823,963
Patented Feb. 18, 1958

2,823,963

ONE-PIECE RING BEARINGS

Harold E. Balsiger, Waynesboro, Pa., assignor to Landis Tool Company, Waynesboro, Pa., a corporation of Pennsylvania Application December 22, 1954, Serial No. 476,996

4 Claims. (Cl. 308—73)

This invention relates to new and useful improvements in a bearing for shafts and more particularly to a bearing for spindles such as a grinding wheel spindle or the like.

An object of the invention is to provide bearings for a rotatable spindle which are ring-like and have spaced bearing segments integrally connected by flexible sections which bearing segments are dimensioned so as to provide an initially wide clearance when assembled on the spindle and to provide means for urging the trailing edge portions only of said bearing segments into engagement with the spindle while the leading edge of said bearing segments are held out of contact with the spindle by the flexible sections, thus forming a wedge shaped clearance between the bearing segments and the spindle through which the lubricant is forced by the rotating spindle.

A further object of the invention is to provide a ring-like bearing of the above type for spindles wherein the bearing segments are provided with radial extensions engaged by the clamping rings of the bearing assembly which extensions are disposed over the trailing end portions only of the bearing segments.

A still further object of the invention is to provide a ring-like bearing of the above type for spindles wherein the connecting sections are spaced away from the spindle and are provided with recesses in the outer face thereof adjacent the trailing edge of the bearing segments and recesses in the inner face thereof adjacent the leading edge of the bearing segments whereby said connecting segments will flex inwardly with the trailing portion of the bearing segments and will flex outwardly with the leading portion of the bearing segments.

These and other objects will be in part obvious and will be in part hereinafter more fully disclosed.

In the drawings which show by way of illustration the improved bearing as applied to a grinding wheel pindle:

Figure 2 is a view in section through the spindle showing the improved bearing in end elevation in its initial form as it is placed on the spindle and Figure 3 is a similar view showing the bearing contracted into supporting engagement with the spindle.

Figure 1:
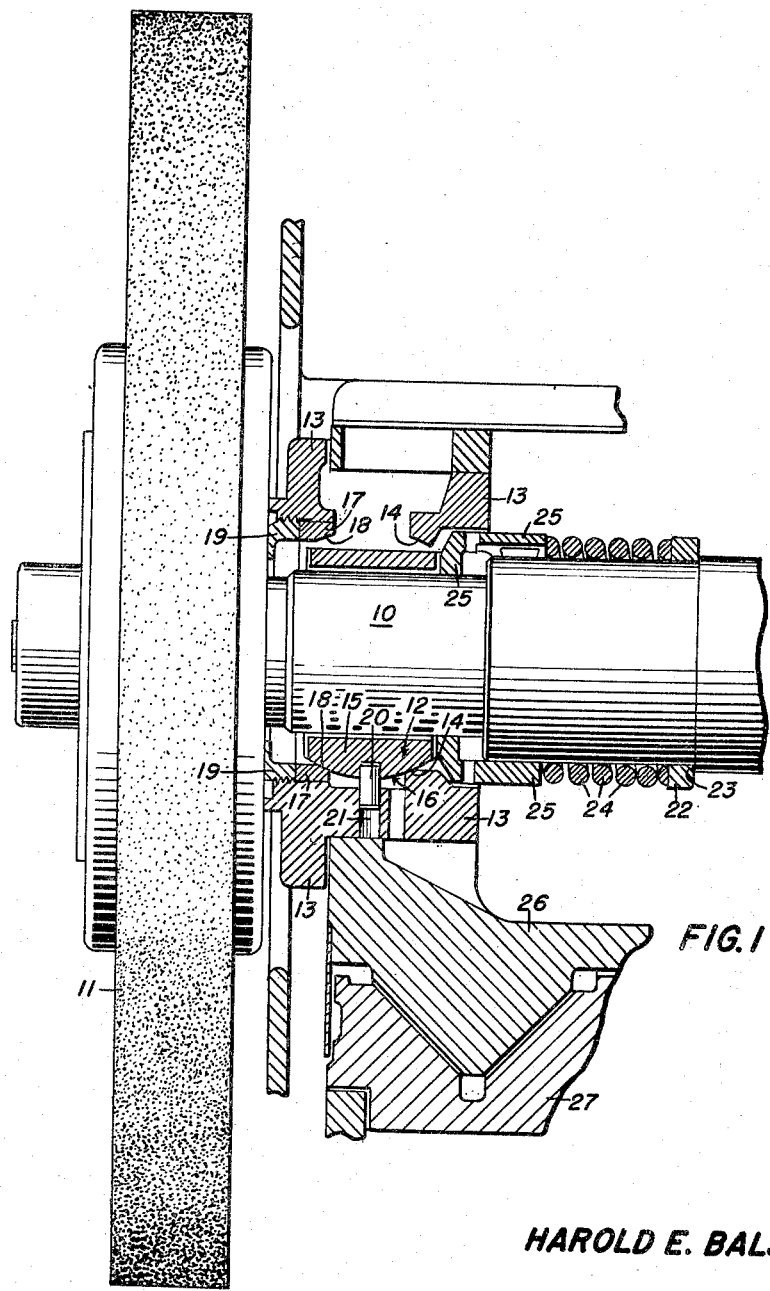
Figure 1 is a view showing one end of a driving spindle on which is mounted a grinding wheel and also showing in section a portion of the housing, the bearing and the parts associated therewith.

The bearing embodying the improvements is illustrated as employed with a grinding wheel assembly where it is essential to maintain the axis of rotation of the supporting spindle in a fixed position for accurate grinding and at the same time to provide ample lubrication between the bearing and the spindle. The grinding wheel assembly is of the usual construction. It includes a spindle 10 on which is mounted the grinding wheel 11. The spindle is mounted in bearings disposed adjacent the ends of the spindle. Only one of the bearings and a portion of the spindle is shown in the drawings and the bearing is indicated at 12. Surrounding the bearing is a housing 13 having an anular bearing supporting surface 14. The bearing has supporting segments 15, the outer surfaces of which by way of example are curved from a maximum diameter at the center to a minimum diameter at the ends as indicated at 16. The supporting surface 14 contacts the surface 16 adjacent one end of the bearing. At the opposite end of the bearing 12 is an annular clamping ring 17 that contacts the curved surface 16 adjacent the other end of the bearing. Threaded into the housing 13 is a nut 19 which engages the clamping ring 17 and forces the same laterally into contact with the surface 18 of the bearing and the bearing into contact with the annular surface 14 on the housing 13.

The bearing is held from rotation in the housing 13 by a pin 20 disposed in an opening 21 in the housing and engaging an opening 21a in the bearing 12. Mounted on the spindle 10 is a ring 22 which engages a shoulder 23 on the spindle. This ring 22 serves as an abutment for the spring 24. Also mounted on the spindle is a sleeve 25 which engages the inner face of the bearing 12. The spring bears against the sleeve and is under compression. This, together with an abutment shoulder at the other end of the spindle contacting the other bearing prevents the spindle from moving endwise in its bearings. This spring, associated ring and sleeve form no part of the present invention. The housing 13 carrying the bearing is mounted in a carriage 26 which slides on the bed 27 in the usual manner.

The bearing is shown more in detail in Figures 2 and 3 of the drawings. The bearing 12 is a ring-like member having three equally spaced bearing segments indicated at 15. Each bearing segment includes an inner member 28 which is initially curved about the center of the spindle 10 with which it is to be associated and on a radius slightly greater than the radius of the spindle so as to provide a clearance space 29 between the bearing segment and the rotatable spindle which initially is substantially in excess of that normally used for bearing purposes. In Figure 2 the bearing ring-like member is shown as initially assembled relative to the spindle and the clearance space is shown as substantially of uniform width between the bearing segments and the spindle.

Each bearing segment has a bearing supporting portion 30 disposed between the center of the segment and the trailing end thereof and it is the surfaces 16 of these bearing supporting portions that are engaged by the supporting surfaces 14 and 18 of the bearing assembly.

The bearing segments 15 are integrally connected by flexible sections 31. Each integral section 31 has a recess or cut-away portion 32 disposed adjacent the leading end of the bearing segment to which it is integrally joined. Each flexible section is also provided with a recess 33 adjacent the trailing end of the bearing segment to which it is integrally joined.

When the clamping ring 17 is forced onto the outer curved surface of the bearing segments it will contact all three of the bearing segments and will distort the bearing ring-like member radially so as to bring the trailing end portion of the segment 28 into engagement with the spindle. The flexible section at the leading end of the bearing segment will be forced outwardly thus producing a clearance space 34 which tapers inwardly from the leading end of the bearing segment to a point where the bearing segment makes engagement with the spindle. The end of the flexible section which is formed integral with the trailing end of the bearing segment will move inward with said trailing end. In order to permit the leading end portion of the segments 15 to move outwardly, the surface 16 is initially curved inwardly away from the surfaces 14 and 18, as indicated at 16a in Figure 2.

This flexible section which moves inwardly with the trailing end of the segment and outwardly with the leading end portion of the bearing segment causes the bearing segment to engage the spindle at the trailing end and remain spaced or move outward from the spindle at the leading end portion thereof. This is what produces a tapered clearance terminating at the portion of the inner surface of the bearing segment which makes contact with the spindle. It is this contacting surface between the bearing segments and the spindle which supports the same and inasmuch as the pressure exerted against the bearing segments by the clamping ring is substantially the same at each segment the spindle will be held from any lateral movement during operation which would result in inaccurate grinding of the workpiece operated upon.

The bearing segments are submerged in a lubricant and the spindle as it rotates will force the lubricant into the wedge shape clearance space 34 and this wedging action on the lubricant will force the lubricant through the zero clearance in order to prevent metal to metal contact while maintaining a rigid support for the spindle.

This close contact between the bearing segments and the spindle, together with the uniform radial adjustment of the bearing segments in all directions, keeps the spindle on a fixed axis, which, as noted above, is necessary for accurate grinding. The tapered clearance leading to a substantially zero clearance at the region where the bearing segments support the spindle also insures ample lubrication for the bearing.

While the bearing has been described in connection with a grinding wheel and its supporting spindle it is to be understood that the bearing may be used with many types of mechanisms where it is desirable to maintain a shaft or a spindle on a fixed axis of rotation.

It is obvious that many changes in the details of construction may be made without departing from the scope of the invention as set forth in the appended claims.

I claim:

1. In combination with a bearing, a spindle rotatable in the bearing, said bearing comprising a solid ring-like member having peripherally spaced bearing segments and alternate flexible sections formed integral with the ends of adjacent bearing segments, and forming the sole connection therebetween, the clearance between the bearing segments and the rotatable spindle being initially in excess of that normally used for bearing purposes, each segment having on its outer face a contact portion disposed adjacent the trailing end on the segment, the outer faces of the contact portions being of increasing diameter transversely toward the center thereof, retaining means for engaging said outer faces of the contact portions, and means for adjusting said retaining means so as to rock the trailing end portions of the bearing segments into supporting contact with the spindle, and forcing the leading end portions thereof outwardly to provide a wedge-shaped clearance between the spindle and the bearing segments terminating in a substantially zero clearance at the trailing end portion through which lubricant is forced by the rotating spindle.

2. In combination with a bearing, a spindle rotatable in the bearing, said bearing comprising a solid ring-like member having peripherally spaced bearing segments and alternate flexible sections formed integral with and connecting said bearing segments, the clearance between the bearing segments and the rotatable spindle being initially in excess of that normally used for bearing purposes, each segment having on its outer face a contact portion disposed adjacent the trailing end on the segment, adjusting rings for engaging said outer faces of the contact portions, and means for adjusting said rings so as to rock the trailing end portion of the bearing segments into supporting contact with the spindle, the outer faces of the contact portions at the leading ends thereof being initially gradually curved away from the rings, said inward movement of the trailing ends of the segments forcing the leading ends of the contact portions thereof to move outwardly to provide a wedge-shaped clearance between the spindle and each bearing segment terminating in a substantially zero clearance at the trailing end portion of the bearing segments through which zero clearance lubricant is forced by the rotating spindle.

3. In combination with a bearing, a spindle rotatable in the bearing, said bearing comprising a solid ring-like member having peripherally spaced bearing segments and alternate flexible sections formed integral with the ends of adjacent bearing segments, and forming the sole connection therebetween, the clearance between the bearing segments and the rotatable spindle being initially in excess of that normally used for bearing purposes, each segment having on its outer face a contact portion disposed adjacent the trailing end on the segment, the outer faces of the contact portions being of increasing diameter transversely toward the center thereof, opposed adjusting rings for engaging said outer faces of the contact portions, and means for adjusting said rings so as to force the trailing end portions of the bearing segments into supporting contact with the spindle, said inward movement of the trailing ends of the segments forcing the leading end portions thereof outwardly to provide a wedge-shaped clearance between the spindle and the bearing segments terminating in a substantially zero clearance at the trailing end portion through which lubricant is forced by the rotating spindle, each of the flexible sections being weakened adjacent the leading and trailing ends of the bearing segments which they connect to facilitate the distorting of the ring-like member under pressure of the adjusting rings and the outward movement of the leading ends of the bearing segments.

4. In combination with a bearing, a spindle rotatable in the bearing, said bearing comprising a solid ring-like member having peripherally spaced bearing segments and alternate flexible sections formed integral with the ends of adjacent bearing segments, and forming the sole connection therebetween, the clearance between the bearing segments and the rotatable spindle being initially in excess of that normally used for bearing purposes, each segment having on its outer face a contact portion disposed adjacent the trailing end on the segment, the outer faces of the contact portions being of increasing diameter transversely toward the center thereof, opposed adjusting rings for engaging said outer faces of the contact portions, and means for adjusting said rings so as to force the trailing end portions of the bearing segments into supporting contact with the spindle, said inward movement of the trailing ends of the segments forcing the leading end portions thereof outwardly to provide a wedge-shaped clearance between the spindle and the bearing segments terminating in a substantially zero clearance of the trailing end portion through which lubricant is forced by the rotating spindle, each of the flexible sections being recessed on their outer faces adjacent the leading ends of the bearing segments and recessed on their inner face adjacent the trailing ends of the bearing segments to facilitate the distorting of the ring-like member under pressure of the retaining rings and the outward movement of the leading ends of the bearing segments.

References Cited in the file of this patent

FOREIGN PATENTS

| 23,496 | Great Britain | 1911 |
|---|---|---|
| 1,056,888 | France | Oct. 28, 1953 |
| 1,058,217 | France | Nov. 4, 1953 |